(12) United States Patent
Hoeft et al.

(10) Patent No.: US 6,551,691 B1
(45) Date of Patent: Apr. 22, 2003

(54) ABSORBENT PAPER PRODUCT OF AT LEAST THREE PLIES AND METHOD OF MANUFACTURE

(75) Inventors: Benoît Hoeft, Bischwihr (FR); Pierre Graff, Wolfgantzen (FR)

(73) Assignee: Gerogia-Pacific France, Kunheim (FR)

( * ) Notice: Subject to any disclaimer, the term of this patent is extended or adjusted under 35 U.S.C. 154(b) by 75 days.

(21) Appl. No.: 09/651,995

(22) Filed: Aug. 31, 2000

(51) Int. Cl.⁷ .............................. B32B 3/00; D21H 11/00
(52) U.S. Cl. ...................... 428/172; 428/154; 428/166; 162/109
(58) Field of Search .................... 428/154, 156, 428/166, 172; 162/111, 112, 113, 109

(56) References Cited

U.S. PATENT DOCUMENTS 5,173,351 A * 12/1992 Ruppel et al. .............. 428/154

* cited by examiner

Primary Examiner—Donald J. Loney
(74) Attorney, Agent, or Firm—Breiner & Breiner, L.L.C.

(57) ABSTRACT

The object of the present invention is an absorbent paper product including at least three plies, and a method of manufacture therefore. The absorbent paper product is of an approximate specific surface weight between 36 and 105 g/m², and includes at least three plies, namely a central ply and two embossed upper and lower outer plies each including salient patterns composed of at least in part discrete protrusions. The plies are joined by joining at least part of the protrusions of each of the outer plies to the central ply. At least one of the outer plies has a pattern density larger than 30 protrusions/cm². The embossed lower outer ply (2) includes combined high and low patterns (5 and 7) of respective heights (H) and (h). The central ply (4) and the embossed upper outer ply (3) are joined in the nested mode to the embossed lower outer ply (2) at the level of at least part of the tops of the high pattern (5) of height (H) of the embossed lower outer ply (2).

13 Claims, 1 Drawing Sheet

ABSORBENT PAPER PRODUCT OF AT LEAST THREE PLIES AND METHOD OF MANUFACTURE

FIELD OF INVENTION

The present invention relates to absorbent paper products and, more specifically, to products made of cellulose cotton and suitable for sanitary and household uses. Essentially, the invention applies to toilet paper, however it also may be used for household purposes such as towels, hand towels, table napkins, handkerchiefs, etc., all being of paper.

BACKGROUND OF INVENTION

In general, absorbent paper products consist of one or more superposed, cotton cellulose plies which can be interconnected.

As regards toilet paper, conventional products include two or three, even four joined plies.

More specifically, the present invention concerns a product of at least three plies and to a method of manufacture therefore.

U.S. Pat. No. 3,414,459 describes an absorbent paper structure of at least two plies. It also cites a product of three joined plies, a third ply being sandwiched between two embossed outer plies. This structure is based on plies of a specific surface weight of about 17 g/m$^2$ for each ply. According to the manufacturing method described in this patent, the two outer plies are embossed separately with a salient pattern consisting of discrete protrusions. Each ply is made to pass between a metal cylinder engraved in relation to the desired pattern and a smooth rubber cylinder. Each ply so made in general is fitted with a repeat pattern 3 to 30 protrusions per unit area, here cm$^2$.

As regards the three-ply structures disclosed in the above U.S. patent, the pattern density, that is the number of protrusions per unit area is about 11 protrusions/cm$^2$.

The third and unembossed ply is sandwiched between the two embossed ones and, more specifically, it is configured between the distal areas, or tops of the protrusions of each ply. In other words, the protrusions point inward of the structure. The three plies are joined by being made to pass within the compression interval between two engraved metal cylinders each belonging to the outer plies' embossing apparatus. The bosses of each engraved cylinder are configured to be mutually opposite each other. This joining technique in general is called "tip-to-tip". In the above U.S. patent, the three plies are connected by applying a sufficiently high pressure to produce interfiber connections. No adhesive at all is applied to the distal areas of the protrusion patterns of the outer plies.

However, the manufacturing method described in the prior art patent entails rapid wear of the embossing cylinders because of the high compression which must be applied to join the three plies.

Furthermore, the structure described in the above U.S. patent is of low pattern density (about 10 to 15 protrusions/cm$^2$). The three ply products with such structures are mainly intended for use as rags or paper towels that foremost demand mechanical strength and especially absorption. Accordingly, the embossings are comparatively deep and hence of low density.

Other absorbent paper products consist of three plies which are joined in a different way. Illustratively, there are products for which on one hand a set of two superposed plies are embossed, and on the other hand, a third ply, by two distinct embossing apparatus. The first two superposed plies as well as the third ply are embossed into salient patterns constituted of protrusions. The pattern density per se remains low, that is it is less than 20 protrusions/cm$^2$ for this kind of product. The two superposed plies and the third ply are joined by a joining cylinder so that the distal areas of the protrusions of the two superposed plies are situated opposite the surfaces situated between two protrusions in the plane of the third ply. This technique is called "nesting".

In the text below, the definition of "nesting" is extended to the case wherein the interconnection plane between the distal area of the protrusions of a first embossed ply and a second ply are situated in the same plane as the plane of the second ply regardless of the relative position of the distal area relative to the protrusions of the second ply. In this manner, the distal area might be situated between two protrusions of the second ply, however it also might cover in part or in whole one of these protrusions which is crushed thereby.

A combination procedure of this sort for three plies is described in the European Patent Application 0 570 578.

The procedure consists in separately embossing a first and a second ply, the second ply consisting of two superposed foils, by means of a first and a second embossing apparatus, the apparatus including an embossing pattern having a density less than 20 protrusions/cm$^2$, in applying at least partly an adhesive to the tops of the protrusions formed into the first or second ply and in joining the two plies by means of an inelastic joining cylinder configured parallel to the engraved cylinders of the embossing apparatus, whereby their protrusions will nest. In this cylinder, the joining cylinder is kept biased against the engraved cylinder at a predetermined minimum distance.

The objective of the structure such as described in the European patent is to manufacture thick products offering a good "feel". However, and especially with respect to toilet paper, the comparatively coarse embossing entails mediocre softness. Also, powerful embossing is required to attain the desired substantial thickness.

Other compound products composed of three plies also have been disclosed.

Illustratively, European Patent Application 0 564 319 describes a product including three separately embossed plies which are consecutively joined. More specifically, small and large protrusions are embossed into a first ply. Protrusions on a second ply are made by separate embossing. The latter protrusions are mutually apart by the same distance as there is between the protrusions of the first ply, that is, at least by the height of a large protrusion of the first ply. Adhesive is deposited on the ends of the protrusions of the second ply and then a pad is made between the first and second plies by superposing the ends of the small protrusions of the first ply and the ends of the protrusions of the second ply in the tip-to-tip position, the large protrusions of the first ply nesting between the protrusions of the second ply.

The third ply is embossed separately and the pitch of this embossing is identical with that of the first ply's larger protrusions. The tops of the third ply's protrusions are coated with adhesive and this third ply and the pad between the first two plies are joined in such a manner that the third ply's protrusion tops will be glued in the tip-to-tip position on the second ply at the level of the first ply's large protrusions.

The product so made offers improved thickness and stiffness. On the other hand its comparatively complex structure requires several gluing stages. The method per se is fairly complex in implementation and entails a fairly complicated industrial facility.

Moreover, the above procedure allows manufacture of only embossed products having a pattern density less than 20 protrusions/cm² and the thickness of the products so made and consisting of these plies will not be optimal.

Lastly a three-ply paper product which is both thick and soft, offers a good feel and is crush-resistant is known from French Patent Application No. 98 02792.

In the above application, the product includes two outer embossed plies each having salient patterns consisting at least in part of discrete protrusions pointing inward the structure, and a central ply. The plies are joined to each other by connecting the distal areas of at least part of the protrusions of each of the outer embossed plies to the central ply. This product is characterized by each of the outer embossed plies being bonded adhesively to the central ply and by at least one of the plies being fitted with a pattern density larger than 30 protrusions/cm².

Also, one of the plies may include joined patterns, for example being at two different heights relative to the ply's reference plane.

However, the joining mode between the different plies is the tip-to-tip type with all the drawbacks attaching to this junction mode.

OBJECTS AND BRIEF DESCRIPTION OF THE INVENTION

The object of the present invention is palliation for the set of above cited drawbacks both as regards the products and their manufacturing procedures.

Another object of the present invention is to create a novel product constituted by at least three plies which are thick and soft, offer a good feel, and resist crushing once wound up in a roll.

The object of the invention is an absorbent paper product with a specific surface weight of approximately 36 to 105 g/m² and including at least three plies, two outer plies (namely a lower and an upper ply) which are embossed and each bearing salient patterns constituted at least in part of discrete protrusions, and a central ply, the distal areas of at least part of the protrusions of each of the outer plies facing toward the central ply, and at least one of the outer plies having a pattern density larger than 30 protrusions/cm², the lower embossed outer ply being fitted with a first and a second pattern, the second pattern being of a height less than that of the first pattern, characterized in that the central ply and the embossed upper outer ply are joined in a nesting manner with the lower embossed outer ply at the level of at least part of the tops of the first pattern of the embossed lower outside ply.

In surprising manner, such a structure combines greater softness and greater thickness. On one hand, fine embossing imparts great touch softness to the sheet's outer surface and, on the other hand, it offers very good crush resistance. The latter property is enhanced by the central ply which precludes any nesting between the two outer plies, as would take place in the absence of the central ply, because such very fine protrusions would provide only tiny support areas.

Another object of the present invention is a novel product including at least three plies of the nested type and which is used as toilet paper, table napkins, handkerchiefs, rags or the like.

Still another objective of the invention is a fabrication method for an absorbent paper product including at least three bonded plies, each of a specific surface weight of about 12 to 35 g/m², preferably 12 to 25 g/m², characterized in that it involves:

embossing a first outer ply on an embossing cylinder including at least one salient pattern composed at least in part of embossing tips of height H1 to fit the ply with a first pattern of protrusions, superposing a central ply on the protrusions of the first outer embossed ply, embossing a second outer ply on an embossing cylinder including a salient pattern composed at least in part of embossing tips of height h'1, joining in the nested mode the first outer embossed ply fitted with the central ply to the second outer embossed ply by means of a joining cylinder, and applying sufficient pressure to join the three above plies.

Other features and advantage of the invention are elucidated in the comprehensive description below and in relation to the attached drawings.

DESCRIPTION OF PRESENTLY PREFERRED EMBODIMENTS

Figure 1:
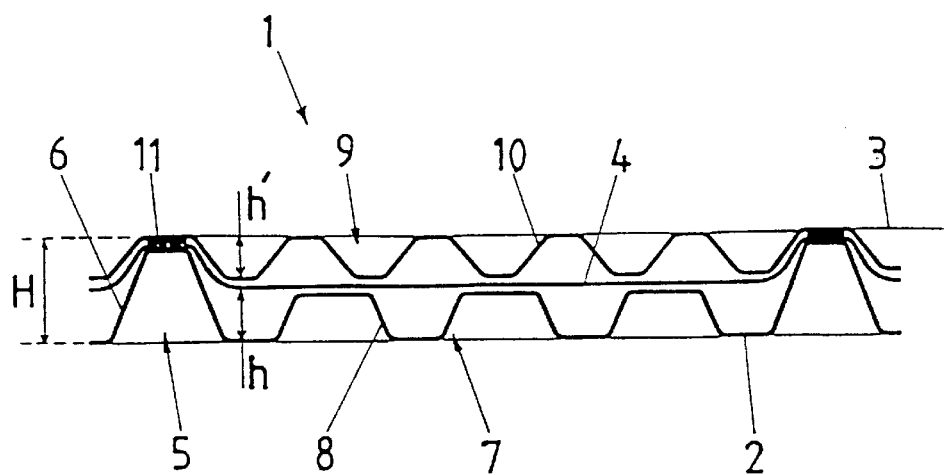
FIG. 1 is a cross-section of the structure of a product of the invention.

As regards FIG. 1, the product 1 of the invention is an absorbent paper product of a specific surface weight of about 36 to 105 g/m² and includes at least three plies 2, 3 or 4, a central ply 4 and two embossed outer plies, namely a lower one 2 and an upper one 3 each fitted with patterns 5, 7 and 9 at least in part composed of discrete protrusions 6, 8 and 10. The protrusions face the central ply 4. The plies 2, 3 and 4 are combined by joining the distal areas of at least part of the protrusions 6 of the ply 2 and of at least part of the surfaces situated between two protrusions 10 of the ply 3 to the central ply 4. At least one of the outer plies 2 and 3 is fitted with a pattern density larger than 30 protrusions/cm² in patterns 5, 7 and 9. The embossed lower outer ply 2 includes combined high and low patterns 5 and 7 respectively. In one feature of the invention, the central ply 4 and the embossed upper ply 3 are joined in a nested mode at the level of at least part of the tops of the high pattern 5 of the embossed lower outer ply 2.

The first embossed lower outer ply 2 includes a combined pattern, illustratively, composed of the high pattern 5 of high protrusions 6 with a low pattern 7 of low protrusions 8.

The high protrusions 6 of the high pattern 5 are of heights H and the low protrusions 8 of the low pattern 7 are of heights h less than those of the high protrusions 6, hence H>h (FIG. 1).

Advantageously and as shown in FIG. 1, the embossed upper outer second ply 3 includes a single pattern 9, for example, implemented by protrusions 10 of height h'.

Obviously too, the second embossed upper outer ply 3 also may include a combined pattern in the manner of the combined embossed pattern of the lower ply 2, for example in the form of protrusions of two different heights.

The specific surface weight of the product of the invention is between 36 and 105 g/m² approximately. The specific surface weight of each ply is about 12 to 35 g/m² and preferably between 12 and 25 g/m².

As shown in FIG. 1, the protrusions 6, 8 and 10 of each embossed outer ply 2 and 3 point toward the central ply. Again as shown by FIG. 1, in this embodiment, the densities or pitches of the different patterns 5, 7 or 9 (protrusions 6, 8 and 10) are different from one embossed external ply 2 to the other 3. The joining between the upper and lower embossed outer plies 3 and 2 and the central ply 4 is implemented only at the level of the high protrusions 6, the plies 2, 3 and 4 being joined in the nesting mode. In the present application, the term "nesting" extends also to the embodiment wherein the plane of the distal areas of the protrusions 6 corresponds to that of the ply 3 without mandatory need for the top of the protrusions 6 to be sandwiched accurately between two protrusions 10.

At least one of the embossed outer plies 2, 3 is fitted with a pattern density larger than 30 protrusions/cm$^2$ and less than 300/cm$^2$ in patterns 5, 7 or 9. Advantageously, each of the embossed outer plies 2 or 3 has a total pattern density less than 150 and preferably less than 90 protrusions/cm$^2$ in patterns 5, 7 or 9.

The densities of the patterns 5, 7 or 9 of the embossed outer plies 2, 3 may be identical or different. They are different in the embodiment shown.

As shown in FIG. 1, the height differential H-h between the high pattern 5 in the form of protrusions 6 and the low pattern 7 in the form of protrusions 8 of the embossed lower outer ply 2 substantially is equal to the height h' of the pattern 9 in the form of protrusion 10 of the embossed upper outer ply 3 joined to the high pattern 5 (protrusions 6) of the embossed lower outer ply 2. Nevertheless, the thickness of the central ply is more than trivial, it is about 0.1 mm and must be taken into account, considering that the total sheet thickness is 0.6 mm.

If a tip-to-tip procedure were used with a two level pattern, the thickness derived from the higher pattern 5 would be crushed when winding the paper into a roll and be reduced to the height of the lower pattern. In this case, "over-embossing" would only result in depositing adhesive solely to the high part of the pattern.

In the case of the present invention, "over-embossing" serves to house the other two plies. As a result, and assuming one pattern and identical embossing height, no significant discrepancies in physical features exist between the finished product 1 of the invention and a tip-to-tip type product.

In another embodiment (not shown), a product of the present invention is characterized in that the embossed upper outer ply 3, in addition to the pattern 9 of height h' bonded to the pattern 5 of the embossed lower outer ply 2 and to the central ply 4, includes a pattern of a height different from that of the pattern 9 which is not bonded to the central ply 4 and the embossed lower outer ply 2.

The product of the invention includes a layer of adhesive 11 configured between the embossed upper outer ply 3 and the central ply 4. In a preferred embodiment of the invention, this adhesive is deposited at the level of the protrusions 6.

The central ply 4 may offer physical/chemical properties distinguishing it from the embossed outer plies 2 or 3.

Accordingly, the specific surface weight of the central ply 4 may differ from that of at least one of the embossed outer plies 2, 3 to reduce the manufacturing cost without affecting its aesthetics.

Again the fibrous and/or chemical composition of the central ply 4 may be selected to be different from at least one of the embossed outer plies 2, 3, thereby allowing matching of the mechanical strength of the product of the invention to the desired applications without degrading its softness.

Selecting the fibers of the central ply 4 also allows controlling the mechanical strength of the product of the invention so that, for example, at least one of the embossed outer plies 2, 3 contains a substantially short fiber composition whereas the central ply 4 contains a substantially long fiber composition.

This combination therefore allows making a mechanically strong product 1 without foregoing the softness offered by the short fibers.

Advantageously, a product of the invention is characterized in that the delaminating strength of one of the embossed outer plies 2, 3 relative to the central ply 4 is substantially different from the delamination strength of the other of the embossed outer plies 2, 3 relative to the central ply 4.

In another variation, the central ply 4 includes a permanent or temporary anti-moisture agent.

If this additive already is present in a certain proportion in each of the embossed, external plies 2, 3, the central ply 4 may contain a larger proportion.

An example of an anti-moisture agent is a compound of the epichlorohydrine polyamine type marketed under the name of KYMENE SLX by Hercules Corp. The embossed outer plies 2, 3 per se may include a softener or a loosening agent. The multi-ply sheet so made offers very good wet properties and hence good mechanical strength especially on account of the composition of the central ply 4. The sheet also offers surface softness on account of the selection of the fibrous and chemical composition of the two embossed, outer plies 2, 3.

Moreover, each ply 2, 3 or 4 may include one or more layers forming a laminate. In this case, the layers also may be of a different fibrous and/or chemical composition.

The perceived thickness of a sheet of the invention is comparable to the perceived thickness of a triple-ply sheet made according to French Patent Application No. 98 02792 which uses the tip-to-tip technique.

In order to still further improve flexibility and softness in the product 1 of the present invention, at least one of the embossed outer plies 2, 3 includes a softening agent.

In another feature of the invention, at least one of the plies contains a hydrophobing agent.

Figure 2:
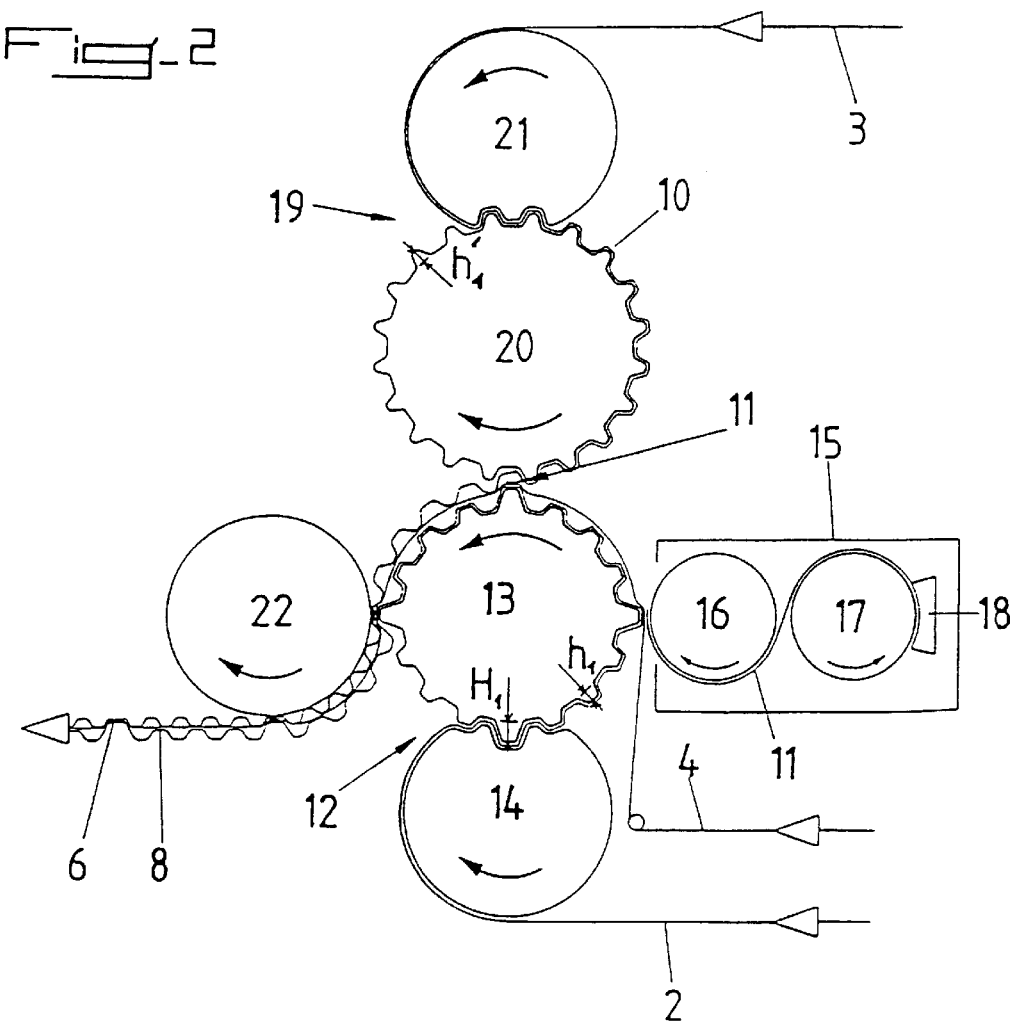
FIG. 2 schematically shows the principle of the manufacturing method of the invention.

The product illustratively shown in FIG. 1 is manufactured by a method shown schematically in FIG. 2.

In FIG. 2, the first lower outer ply 2 is embossed in a first embossing apparatus 12 including an engraved cylinder 13 and a mating rubber cylinder rotating in the opposite direction. The cylinder 13 is engraved in a first high pattern having embossing tips of height H1 and a shallower pattern of embossing tips of height h1.

Thanks to the double-level engraving by the cylinder 13, salient patterns 5, 7 are made on the first lower outer ply 2 which is composed at least partly of high discrete protrusions 6 of height H, for example picots and/or flowers, and of low protrusions 8 of height h, for example picot tips. The heights H and h depend on the depths H1 and h1 of the engravings and also on the other embossing parameters, namely pressure, rubber quality, etc.

Preferably, the picot tips of the first pattern on the cylinder 13 have an engraving height H1 between 0.2 and 2 mm and the picot tips of the second pattern have an engraving height h1 such that the height differential H1-h1 is between 0.1 and 0.7 mm.

Preferably, previously unembossed, the central ply 4 is moved into position and superposed on the protrusions 6, 8 of the first embossed lower outer ply 2 at the level of the engraved cylinder 13. In this manner and mainly by its own weight, the central ply 4 hugs the high protrusions 6 of the embossed lower outer ply 2 while remaining substantially planar between two consecutive high protrusions 6, the planar areas of the low protrusions 8 being able to act as intermediary supports (FIG. 1).

At the level of this junction between the embossed lower outer ply 2 and the central ply 4, an adhesive 11 is applied to the outer side of the central ply 4 using a glue dispenser 15 (FIG. 2).

In parallel, an upper outer second ply 2 is embossed separately by means of a second embossing apparatus 19 into a salient pattern 9 at least in part composed of discrete protrusions 10 of height h'. The apparatus 19 includes a cylinder 20 engraved with a pattern of embossing tips of height h'1 and a mating rubber cylinder 21, the cylinders rotating in opposite directions.

The second embossing cylinder may include either a uniform height engraving or an engraving compound of pattern-fitted zones alternating with smooth, pattern free zones. The pattern free zones then are moved opposite the embossing tips of height H1 of the other cylinder (flowers or big picots) when ply combination takes place.

Furthermore, the second cylinder also may include aesthetic patterns, for example flowers, provided that these patterns are not opposite the picots of height H1 in order to preclude crushing.

Once the adhesive 11 has been deposited on the surface of the central ply 4 on which is applied the first embossed lower outer ply 2, the second embossed upper outer ply 3 and the plies 2 and 4 above are joined in the nesting mode using a joining apparatus or joining cylinder 22. The surface of the joining cylinder 22 may be smooth, however it may also be engraved and fitted with gaps if it is desired to reduce the joined surface and to improve the final product's flexibility.

The joining of the first embossed lower outer ply 2 fitted with the glue-coated central ply 4 to the second embossed upper outer ply 3 is carried out in such a manner that the distal areas of the high protrusions 6 of the first embossed lower outer ply 2 nest at least partly with the distal areas of the protrusions 10 of the second embossed upper outer ply 3 and that sufficient pressure is applied to bond the three plies 2, 3 and 4 by means of the adhesive 11.

In a preferred embodiment of the invention, the adhesive 11 is applied to the outside surface of the central ply 4 opposite the distal areas of the first pattern 5 of the embossed lower outer ply 2.

As shown in FIG. 2, the adhesive 11 is applied by a glue dispenser 15 including an applicator cylinder 16. The applicator cylinder 16 abuts the superposed central ply 4 and the embossed lower outer ply 2 against the engraved cylinder 13, a dipping cylinder 17 transferring the adhesive 11 to the applicator cylinder 16. The dipping cylinder 17 picks up the adhesive in a vat 18. The applicator cylinder 16 exerts a given pressure on the engraved cylinder 13 at the distal area of the high protrusions 6 of the embossed lower outer ply 2. When the pressure is sufficient, the glue crosses the central ply and as a result ply joining is improved. In this manner, the central ply is slightly embossed. In a variation of the embodiment, the adhesive applicator cylinder may be fitted with an engraved surface in order that the adhesive be applied only to part of the tops. In this manner, finished product flexibility is improved.

Because the gluing areas are limited to the distal planar areas of the high protrusions 6 of the embossed lower outer ply 2, the protrusions shown in FIG. 2 at the rate of one high protrusion 6 for three low protrusions 8, the resulting stiffness of the product 1 is advantageously predeterminable and, for example, may be decreased as needed.

The adhesive 11 may be a standard PVA glue or a hot-melt glue. Illustratively, an adhesive sold by SWIFT can be used. This adhesive was diluted to optimal proportions in water to attain appropriate transfer to the plies.

In another embodiment, a hot melt glue is sprayed by appropriate means on each of the sides of the central ply 4. In this circumstance, the glue must be applied before the central ply is in contact with the two outer plies.

In yet another embodiment of the invention, an aqueous adhesive is sprayed onto the central ply 4.

It is clear that the method of the invention for making a three ply paper allows using a facility designed for manufacturing a conventional, nested two ply paper without requiring substantial changes in components or adjustments.

The basic procedure of the method of the present invention is the so-called nested procedure wherein the following modifications are included:

the patterns used in the present invention are conventionally used patterns in the tip-to-tip procedure, namely patterns having a density larger than 20 protrusions/$cm^2$, a central ply has been sandwiched between the two embossed outer plies; this step is impossible for products which are made by a strictly nested procedure which prevents the embossed plies from nesting well and therefore entails product crushing, considering that good crush resistance is due to nesting the two plies.

The method of the invention makes possible manufacturing products with the features of a tip-to-tip product (softness from high density patterns, finer and more aesthetic appearance) by eliminating the drawbacks relating to this method, that is wear of the steel cylinders and the adverse consequences (frequent maintenance and repairs, fluctuating quality, productivity drops, etc.)

Also, the manufacture of the engraved cylinders used within the scope of the method of the present invention may be simplified because these cylinders allow more generous geometric manufacturing tolerances as regards a tip-to-tip facility, the rubber of the joining cylinder more easily following any variations in the engraved cylinder.

Where the appearance of the product of the present invention is to be modified, it suffices to change the cylinder 13 including the combined high and low patterns 5 and 7, while the cylinder 20 with the pattern 9 of the embossed lower outer ply 2 may be kept. This circumstance applies even more if a dyed adhesive is used thanks to which a "printed" pattern is present on the embossed upper outer ply 3.

In advantageous manner, the method of the present invention also allows "over-embossing" a pattern at two heights by filling it with two other plies, and it makes possible improved appearance by keeping the marking implemented by the "over-embossing".

The product of the present invention, or manufactured by the method of the present invention, may be used for toilet paper, napkins, handkerchiefs, rags and the like.

Obviously, the invention is not restricted to the above described embodiments shown in the attached drawings. Modifications may be introduced, in particular as regards the constitution of the various components or by substituting equivalent techniques, without thereby transcending the protected scope of the invention.

What is claimed is:

1. An absorbent paper product of an approximate specific surface weight between 36 and 105 g/m$^2$, comprising at least three plies, a central ply, an embossed upper outer ply, and an embossed lower outer ply, each ply being fitted with a salient pattern including at least in part discrete protrusions, the distal areas of at least part of the protrusions of each outer ply facing the central ply, and at least one of the upper outer ply and lower outer ply having a pattern density larger than 30 protrusions/cm$^2$, the lower outer ply comprising a first pattern and a second pattern, the height of the second pattern being less than the height of the first pattern, wherein the central ply and the upper outer ply are joined in a nested mode to said lower outer ply at a level of at least part of the tops of the first pattern of said lower outer ply.

2. Product as claimed in claim 1, wherein the at least three plies are bonded by an adhesive at a level of the first pattern.

3. Product as claimed in claim 1 wherein each of the upper outer ply and the lower outer ply comprises a total pattern density less than 150 protrusions/cm$^2$.

4. Product as claimed in claim 1 wherein each of the upper outer ply and the lower outer ply comprises a total pattern density less than 90 protrusions/cm$^2$.

5. Product as claimed in claim 1 wherein densities of each pattern of the upper outer ply and the lower outer ply are different.

6. Product as claimed in claim 1, wherein the upper outer ply comprises a second pattern having a height different from the height of the salient pattern.

7. Product as claimed in claim 1 wherein the central ply has a specific surface weight which differs from a specific surface weight of at least one of the upper outer ply and the lower outer ply.

8. Product as claimed in claim 1 wherein the central ply has a fibrous and/or chemical composition which differs from that of at least one of the upper outer ply and the lower outer ply.

9. Product as claimed in claim 1 wherein at least one of the upper outer ply and the lower outer ply comprises a fibrous composition substantially based on short fibers and the central ply comprises a fibrous composition substantially based on long fibers.

10. Product as claimed in claim 1 wherein at least one of the upper outer ply and the lower outer ply contains a softening agent.

11. Product as claimed in claim 1 wherein at least one of the at least three plies contains a hydrophobing agent.

12. Product as claimed in claim 1 wherein the central ply contains an anti-moisture agent.

13. The product of any one of claims 1 through 12 wherein the product is in a form of toilet paper, table napkin, handkerchief, or towel.

* * * * *